United States Patent [19]

Loberg

[11] 4,019,791
[45] Apr. 26, 1977

[54] BALL BEARING RETENTION CONSTRUCTION

[75] Inventor: Grant M. Loberg, Los Angeles, Calif.

[73] Assignee: Industrial Tectonics, Inc., Ann Arbor, Mich.

[22] Filed: Dec. 10, 1975

[21] Appl. No.: 639,287

[52] U.S. Cl. .............................................. 308/217
[51] Int. Cl.² ...................................... F16C 19/20
[58] Field of Search ............................ 308/201, 217

[56] References Cited

UNITED STATES PATENTS

| | | | |
|---|---|---|---|
| 2,772,128 | 11/1956 | Schaeffler et al. | 308/217 |
| 3,450,449 | 6/1969 | Sibley et al. | 308/201 X |
| 3,482,297 | 12/1969 | Vannest | 308/201 X |
| 3,685,877 | 8/1972 | Gould | 308/201 |

*Primary Examiner*—Joseph F. Peters, Jr.
*Assistant Examiner*—Gene A. Church

*Attorney, Agent, or Firm*—Woodhams, Blanchard and Flynn

[57] ABSTRACT

Construction for a ball bearing retainer. There is provided a ball bearing retainer comprising an annulus having a plurality of circumferentially spaced ball receiving openings and one or more ball retaining fins extending radially from said retainer, arranged circumferentially therearound and positioned either tangent to, or for minor intersection with, the ball receiving openings. With balls in place in said openings, the outer ends of said fins are then displaced axially of said annulus toward said balls for retaining them in place. Such displacing of said fins may be accomplished by a single circumferentially applied rolling operation or a single press operation. By appropriate modification of the design, one, two, three or four such fins in varying sizes and arrangements may be used.

16 Claims, 11 Drawing Figures

BALL BEARING RETENTION CONSTRUCTION

FIELD OF THE INVENTION

The invention relates to ball bearing retainers and particularly to a type thereof wherein metal may be displaced for retention of the balls within such retainer by a single rapid rolling or pressing operation. Particularly, one or more fins is (are) provided circumferentially of the retainer and laterally of the ball openings within the retainer. The free edge of such fin or fins may then be displaced toward the balls to hold same in position and such displacing may occur in response to a single rolling operation applied circumferentially of the bearing retainer, or by a single axial pressing operation.

BACKGROUND OF THE INVENTION

Ball bearings have, of course, been known for a long time and an incredible number of specific designs have been offered to the public relating to their construction. Particularly, since many applications of these bearings require their use in large numbers, it has for a long time been essential to minimize their cost and a very large amount of effort over the past years has been expended in this direction. However, much of such effort has been expended with the single purpose in mind of reducing cost and the resulting bearing has often been relatively weak and flimsy and therefore often of only limited use. On the other hand, when efforts have been made in the past to provide a bearing of good strength and endurance, this has often been at the expense of economy in manufacturing. Particularly, in such cases, the displacement of metal for effecting retainment of the bearing in its proper position is usually a separate operation for each bearing ball with a resultant high consumption of time and consequent expense.

It is recognized that the prior art has utilized fins projecting from a bearing retainer for the retention of balls within the retainer but insofar as I am aware such fins have usually been positioned transversely of the retainer, as for example in U.S. Pat. No. 1,318,092 or No. 3,295,899. This, however, does not permit the necessary displacement of the metal by a single operation and hence does not provide the reduction in expense obtained by the present invention. It is also recognized that circumferential placement of retaining fins has been carried out as such, as in U.S. Pat. No. 2,772,128, but here the displacement for retaining the antifriction elements, here rollers, requires a circumferential displacement from the ends of said fins which is an intermittent operation and is not conducive to a single pass by a displacing tool as contemplated for the present invention.

Accordingly, the objects of the invention include:

1. To provide a bearing retainer construction into which bearing balls may be assembled rapidly and efficiently and which when same are so installed will hold them in a firm and reliable manner.

2. To provide a bearing retainer construction, as aforesaid, which will in a first condition receive bearing balls freely into appropriate locations therein and which may then be displaced into a second condition for holding said bearing balls firmly in place.

3. To provide a bearing retainer construction, as aforesaid, wherein said displacing may be carried out quickly and easily and particularly where same may be carried out by a single circumferential motion, or single pressing operation, of an appropriate tool with respect to said bearing retainer.

4. To provide a bearing retainer, as aforesaid, which can be made of sufficiently heavy stock as to be of substantial strength for heavy-duty use without seriously interfering with the attainment of the foregoing-stated objectives.

5. To provide a bearing retainer construction, as aforesaid, which can be expressed in a number of different specific forms in order to adapt same to varying selected use situations.

Other objects and purposes of the invention will be apparent to persons acquainted with apparatus of this general sort upon reading the following specification and inspection of the accompanying drawings.

SUMMARY OF THE INVENTION

Briefly, the invention contemplates providing a bearing retainer in the form of a generally annular body having ball receiving holes circumferentially spaced therein and further providing at least one radially extending fin positioned on said annular body either tangent to said openings or intersecting a minor portion thereof. Upon insertion of the balls into the openings, said fin is then distorted to lean toward said balls and hold them against escape from said openings. This construction makes possible the distortion of the fin or fins by a single motion of a tool relative to the annular body, circumferential rolling or axial pressing, and same may without serious inconvenience be accomplished with a retainer formed of relatively heavy stock for heavy duty usage. Said fins may extend either inwardly or outwardly of the annulus comprising said annular body or may extend in both directions, and may be positioned on either or both sides of said openings. Thus, according to the usage required there may be provided one, two, three or four fins as desired and same may be employed in various combinations of sizes and arrangements as appropriate to meet varying operating conditions and considerations of expense.

DETAILED DESCRIPTION

Figure 1:
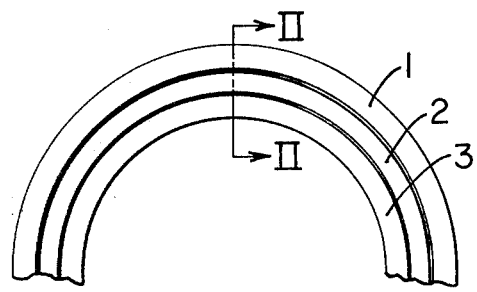
FIG. 1 is a side fragmentary elevational view of a bearing embodying the invention.
Figure 3:
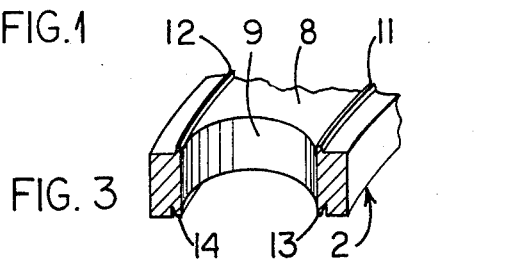
FIG. 3 is an oblique sectional view of the bearing retainer alone, the sectional portion being on any axially radial plane and showing the retainer prior to insertion of balls thereinto.
Figure 2:
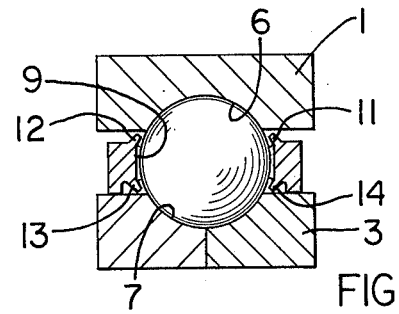
FIG. 2 is a section taken on the line II—II of FIG. 1.

Referring now to the drawings, one illustrative form of the invention appears in FIGS. 1, 2 and 3 wherein an outer bearing race 1 surrounds a retainer 2 which in turn surrounds an inner bearing race 3.

The inner and outer races may be constructed in any of many desired forms as will be apparent to those skilled in the art. Thus, the inner and outer races herein illustrated are for illustrative purposes only and may be freely modified as desired. Primarily said inner and outer races provide raceways 6 and 7 and appropriate means, not shown, if and as required by conventional practice for the reception and capturing of the retainer.

Turning now to the retainer, there is provided an annular body comprising an annulus 8 of generally rectangular cross section, with thickness sufficient to provide the desired strength for a given instance of use and of width determined by the bearing balls it is designed to retain together with the manner of its being held within the races. Said annulus 8 is provided with a plurality of circumferentially spaced openings 9 for the retention of the bearing balls and which in a known manner are made of diameter slightly larger than that of the balls to be retained and may be, as is conventional, slightly elongated circumferentially. The spacing between said openings 9 is conventional and determined by the load to be carried by the bearing and other criteria well known to the art.

Figure 4:
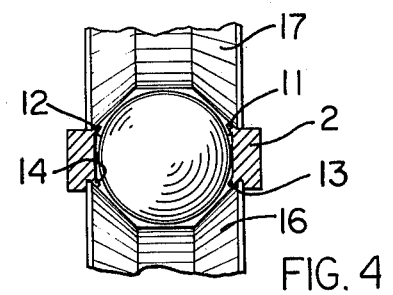
FIG. 4 is an axially radial section of the retainer illustrating the displacing operation.

In the example illustrated in FIGS. 2 and 3, there are provided four fins 11, 12, 13 and 14 which extend circumferentially around the annulus 8 and are initially aligned in planes substantially perpendicular to the axis of said annulus. In the form shown, said fins are placed substantially tangent to the openings 9. With the balls positioned in the openings 9 and held therein by any suitable fixture means, not shown in detail, but which may include a rotatable anvil 16 (FIG. 4), the fins 11-14 are bent toward said balls in any desired manner such as by their free edges being displaced axially of the annulus by rolling. Said rolling may, for example, be by a powered roller 17 moving circumferentially with respect to the annulus 8 and bearing against the rotatable anvil 16 by which both the inside and outside pairs of fins are displaced as desired. Of course, the exact means by which said rolling is carried out forms no part of the present invention and same may within the scope of the invention be carried out in any manner desired.

With the fins 11-14 displaced as above described, the retainer will then hold said balls firmly and may be further handled as desired. In the embodiment shown, same may be inserted into the upper race 1, the balls being enabled in a conventional manner to pass the portion of the inner diameter on either side of the external raceway by reason of their being sufficiently loose in the retainer to move somewhat centerward thereof. The inner race may then be inserted with the two halves thereof coming together as shown to position the balls snugly between the inner and outer raceways and the two halves of the inner race being held together in any conventional manner (not shown). It will be recognized, of course, that the particular races shown and the mounting of the retainer and balls therein are merely illustrations of one way by which the retainer may be fixed into appropriate races and others in wide variety will immediately occur to those skilled in the art.

Figure 5:
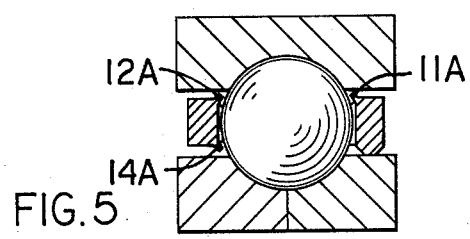
FIG. 5 is a section similar to FIG. 2 and showing a modification.
Figure 6:
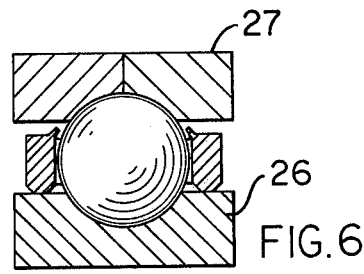
FIG. 6 is a section similar to FIG. 2 and showing another modification.

In FIG. 5 there is shown a modification in which only three of said fins are used, namely the fins 11a, 12a and 14a corresponding to the fins 11, 12 and 14 in the form of FIGS. 2 and 3. Similarly FIG. 6 shows a construction wherein the inner race 26 provides the internal retention for the bearing balls and the retainer is provided with only two fins for providing the external retention. In such case the retainer and inner race will be assembled together, the balls placed into the openings of the retainer and the free edges of the two outwardly directed fins then displaced axially toward each other by any appropriate procedure, such as rolling or axially applied pressing. The outer race may then be inserted and fixed as desired, such as by a split outer race 27 held together in any conventional manner (not shown). Alternatively, of course, other conventional assembly methods may be used, such as the so-called "pop-fit" wherein the balls are inserted after the retainer is positioned over the ring.

The arrangement of FIG. 6 may in the light of the foregoing be inverted inwardly to outwardly and no illustration thereof is needed.

Figure 7:
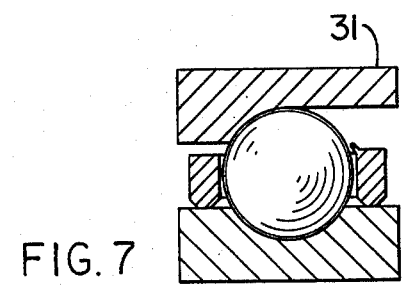
FIG. 7 is a view similar to FIG. 2 and showing a still further modification.

FIG. 7 illustrates the manner in which only a single retaining fin may be used. In the form shown, same is assembled in any conventional manner, such as the pop-fit above mentioned or by assembling the retainer with the inner race, placing the balls placed in position and then displacing the fin by circumferential rolling, axial pressing or other convenient method into ball retaining position. The outer race may then be applied and held as desired in this case, again by utilizing a split retaining ring 31.

Figure 8:
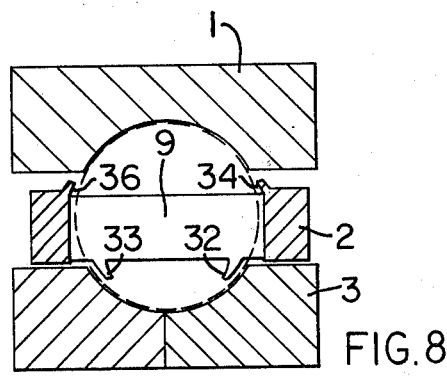
FIG. 8 is a view similar to FIG. 2 of a still further modification wherein two of said fins are interrupted by the ball retaining openings.
Figure 9:
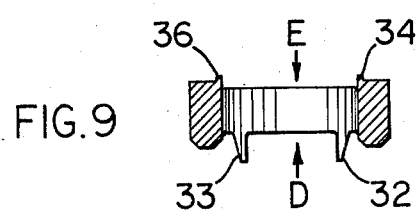
FIG. 9 shows the retainer in radial section prior to distorting of the fins.
Figure 10:
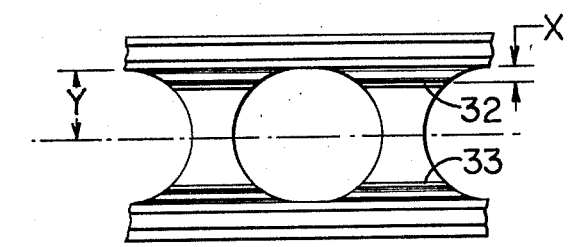
FIG. 10 is a rolled-out view of a fragment of the modification of FIG. 9 viewed radially from the interior of the retainer, namely from the direction of the arrow D in FIG. 9.
Figure 11:
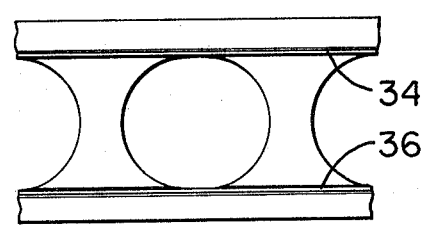
FIG. 11 is a rolled-out segment of FIG. 9 viewed radially from the exterior of the retainer, namely from the direction indicated by the arrow E in FIG. 9.

FIGS. 8 and 9 show a further modification in which the two fins 32 and 33 are positioned to intersect the openings 9 and the two fins 34 and 36 are tangent to the ball openings. The fins 32 and 33 are because of the geometry of the ball somewhat larger than is necessary for fins tangent to the ball openings and, although same are intersected by the ball openings they are placed sufficiently close to the edges of said openings that when their free edges are tilted axially in the manner shown in FIG. 2 they will bear against the bearing balls and hold same in retained position. While the exact distance which the fins 32 and 33 can be spaced inwardly from a line tangent to two or more of said ball openings is somewhat variable depending upon the actual diameter of the bearing, the size of the balls, the firmness of holding desired and other factors which will be apparent to persons skilled in the art, it will be recognized that the geometry of a ball is such that such distance, namely the distance X in FIG. 9, will be normally not greater than about one-third of the distance from said common tangent to a common centerline through said openings, namely the distance Y in FIG. 9. In the particular embodiment illustrated in FIGS. 8 and 9, the actual ratio, measuring to the center of the fin, of X/Y was 2/9, X in said embodiment being 0.1 inch and Y therein being 0.45 inch.

It will be further observed upon inspection of FIG. 8 that the interrupted fin makes it possible to use a race, here the inner race, fitting snugly against the inner diameter of the retainer and extending at least all of the way to the ball openings, in the embodiment of FIG. 8 somewhat beyond the ball opening, whereas with the fins tangent to the ball openings the race must be spaced radially a short distance from the retainer as shown in the several drawings and particularly in connection with the outer fins 34 and 36 appearing in FIG. 8. In this manner, sufficient radial movement of the balls inwardly of the retainer is provided to enable same to clear the edges of the outer race and be assembled into or disassembled from the outer raceway 1 while being held snugly in position between the races when the inner race is installed into its position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A retainer for ball bearings, comprising:
an annulus having radially inner and outer faces;
means defining a plurality of circumferentially spaced openings in said annulus, said openings extending substantially radially through said inner and outer faces;
at least one bearing retaining fin or one of said faces, said fin being directed radially and away from said one face of said annulus, said fin extending circumferentially of said annulus in one of tangential and intercepted relation with said openings, one radially extending surface of said fin being flush with and continuing from the perpheral wall of said opening, said fin being bendable axially inward of said annulus to a radial-axial angled position in which its said one surface overlaps part of said opening for retaining of a ball therein.

2. The device of claim 1, in which said fin is tangential of said plurality of openings at its joinder to said one face of said annulus, the axially inward facing one of the side walls of said fin being a continuation of the peripheral wall of a given said opening.

3. The device of claim 1, in which said fin is disposed axially between a common tangent of said openings and the common center line thereof and is disposed axially closer to the former than to the latter, such that said fin is interrupted by said openings and extends as a series of circumferential fin segments alternating with said openings, said radially extending surface of said fin being the circumferential end surface of a said fin segment, such that the circumferential ends of the fin segments are substantially flush continuations of the peripheral wall of the adjacent opening, the longitudinal extent of said fin segments being circumferential of said annulus and directed substantially chordally of said openings.

4. A retainer for ball bearings, comprising:
an annulus having radially inner and outer faces;
means defining a plurality of circumferentially spaced openings in said annulus, said openings extending substantially radially through said inner and outer faces;
at least one bearing retaining fin on one of said faces and extending circumferentially around said annulus at a common tangent of said openings, said fin being tilted in a direction axially of said annulus from a radially extending position and extending at an angle to both the axis of said annulus and to a radial plane of said annulus opening to at least assist in holding a ball in said opening, said tilted fin having axially inner and outer sides, the axially inner said side being located tangentially of a ball centered in said opening.

5. The device of claim 4, in which said annulus carries two said fins on said one face thereof, said two fins having respective base portions at which they join said annulus and tangential to said openings, such that the axial separation of two base portions of said fins equals the diameter of said openings, said two fins as seen in cross section being angled convergently with respect to each other in a direction away from the center of said annulus with the free edges of said fins being axially spaced less than the diameter of said openings, so as to overlie said openings and block exit of a bearing ball therefrom.

6. The device of claim 5, including a third fin carried by the other said face of said annulus directly radially opposite one of said two fins on said one surface of said annulus and being arranged on said other annulus surface in a manner substantially as above recited with respect to the arrangement of said one fin on said one surface of said annulus, such that said one fin and said third fin diverge in opposite radial directions from their respective faces of said annulus to block radial movement of a bearing ball in the adjacent opening in both radially inward and outward directions.

7. The device of claim 4, in which the free edge of said fin is substantially flush with said one face of said annulus, said annulus including an annular groove in said one face of said annulus and axially separating said fin from the axially outboard portion of said annulus.

8. The device of claim 4, in which only a single said fin is provided on said one face of said annulus.

9. The device of claim 4, in which said annulus includes four such fins, two on said radially inner side of said annulus, on opposite sides of the circumferential row of openings, and the remaining two such fins on the radially outer side of said annulus, in radial opposition to respective ones of the first mentioned two fins, all said fins being tangential to said openings.

10. The device of claim 4, including two said fins on said one face of said annulus and tangent to said openings on axially opposite sides thereof, and a pair of further fins on the other said face of said annulus, said further pair of fins being spaced upon opposite sides of the common center line of said openings and to a lesser extent spaced axially inboard of tangents on opposite sides of said openings, such that said openings intersect each of said further fins and divide each said further fin into a circumferentially spaced plurality of fin segments, each of said fins being tilted from a radial plane to an attitude angled axially inward, such that said tangential fins extend convergently with respect to each other over side portions of said opening, and the ends of a pair of segments of said further fins tilt axially toward each other and overlie a chord of the adjacent opening.

11. A retainer for ball bearings, comprising:
an annulus having radially inner and outer faces;
means defining a plurality of circumferentially spaced openings in said annulus;
at least one bearing retaining fin on one of said faces extending circumferentially around said annulus between the common circumferential tangents of said openings and circumferentially interrupted by said openings to form a circumferential series of fin segments, said fin lying close inboard of one of said common tangents and being offset remotely outboard of the common centerline of said openings, the ends of said fin segments being a flush continuation of the wall of the intervening said openings, adjacent fin segments being separated by and having their length direction substantially aligned with a chord of said intervening opening, adjacent segments of said fin in their initial position being radially directed with their circumferentially opposed ends spaced circumferentially by substantially less than the diameter of said intervening opening, said fin segments having a ball retaining position axially inwardly tilted from said initial position, the free end of said fin segment thus overlapping a part of the adjacent opening axially inboard from said chord, by reason of said axially inward tilted condition of said fin segment, so as to at least partly block removal of a bearing ball from said opening.

12. The device of claim 11, wherein two such circumferentially extending fins are provided on said one face of said annulus, said two fins being spaced axially on opposite sides of said common centerline of said openings near but inboard of the respective common tangents of said circumferentially spaced openings, said two fins being axially inwardly tilted toward each other, the two fins having two axially opposed segments whose axially opposed free ends angle toward each other in partially bridging relation across the adjacent said opening for retaining a bearing ball in said opening.

13. The device of claim 11, including at least one further circumferentially extending fin on the other said face of said annulus, said further fin being offset axially of the common centerline of said openings and at least near a common tangent of said openings.

14. The device of claim 13, in which said further fin is tangent to said circumferentially distributed openings and is tilted at a radial-axial angle to overlap said openings, said further fin being of lesser cross-sectional height than said first mentioned fin.

15. The device of claim 11, wherein said fin is spaced centerward of the openings from a tangent common to at least two such openings a distance not greater than one-third of the distance from said common tangent to a common centerline of said openings.

16. The device of claim 15 wherein said centerward spacing of said fins is two-ninths of the distance from said common tangent to said common centerline.

* * * * *